United States Patent
Dole et al.

(10) Patent No.: US 6,581,977 B1
(45) Date of Patent: Jun. 24, 2003

(54) SEGMENTED PIPE COUPLINGS EMPLOYING T-BOLTS AND IMPROVED T-BOLTS THEREFOR

(75) Inventors: Douglas R. Dole, Whitehouse Station, NJ (US); Dennis A. Mason, Brooklyn, NY (US); Jon T. Stone, Easton, PA (US)

(73) Assignee: Victaulic Company of America, Easton, PA (US)

( * ) Notice: Subject to any disclaimer, the term of this patent is extended or adjusted under 35 U.S.C. 154(b) by 0 days.

(21) Appl. No.: 08/848,302

(22) Filed: Apr. 28, 1997

(51) Int. Cl.[7] ............................................. F16L 21/06
(52) U.S. Cl. ..................... 285/112; 285/373; 285/368; 285/419
(58) Field of Search ................................ 285/112, 373, 285/419, 368

(56) References Cited

U.S. PATENT DOCUMENTS

| | | |
|---|---|---|
| 960,899 A | 6/1910 | Guyer |
| 1,093,868 A | 4/1914 | Leighty |
| 1,400,063 A | 12/1921 | Hinton |
| 1,930,194 A | 10/1933 | Dillon |
| 2,450,091 A | 9/1948 | Kendall |
| 2,459,251 A | 1/1949 | Stillwagon |
| 2,479,580 A | 8/1949 | Marco |
| 2,760,792 A | 8/1956 | Fons |
| 2,789,457 A | 4/1957 | Allen |
| 2,828,986 A * | 4/1958 | Mahoff et al. ........... 285/367 X |
| 2,837,383 A * | 6/1958 | Skelly ..................... 285/367 X |
| 2,895,197 A * | 7/1959 | Agne et al. .............. 285/367 X |
| 2,998,629 A | 9/1961 | Smith |
| 3,154,829 A | 11/1964 | Pahel et al. |
| 3,238,581 A | 3/1966 | Sawyer |
| 3,346,114 A | 10/1967 | Hoyt |
| 3,464,722 A * | 9/1969 | Larkin ........................ 285/367 |
| 3,471,176 A | 10/1969 | Gilchrist |
| 3,565,468 A | 2/1971 | Garrett |
| 3,672,613 A | 6/1972 | Oriani ........................... 248/62 |
| 3,749,362 A | 7/1973 | O'Connor et al. ............. 254/29 |
| 3,944,265 A | 3/1976 | Hiemstra et al. ............ 285/419 |
| 4,108,479 A | 8/1978 | Straub ......................... 285/112 |
| 4,119,130 A | 10/1978 | Berecz ..................... 151/41.76 |
| 4,261,600 A | 4/1981 | Cassel ......................... 285/177 |
| 4,364,588 A | 12/1982 | Thompson ................... 285/419 |
| 4,400,018 A | 8/1983 | Abbes et al. .................. 285/31 |
| 4,408,788 A | 10/1983 | Beukema ..................... 285/419 |
| 4,463,975 A | 8/1984 | McCord ...................... 285/419 |
| 4,490,065 A | 12/1984 | Ullrich et al. ............... 403/379 |
| 4,611,839 A | 9/1986 | Rung et al. .................. 285/367 |
| 4,623,164 A | 11/1986 | Cassel et al. ................ 280/689 |
| 4,639,020 A | 1/1987 | Rung et al. .................. 285/367 |
| 4,784,202 A | 11/1988 | White ....................... 152/381.5 |
| 4,813,720 A | 3/1989 | Cassel ......................... 285/419 |
| 4,830,557 A | 5/1989 | Harris et al. ................. 411/113 |
| 4,861,075 A | 8/1989 | Pepi et al. ................... 285/112 |
| 4,896,902 A | 1/1990 | Weston ......................... 285/93 |
| 5,171,099 A | 12/1992 | Westre ........................ 403/264 |
| 5,246,257 A | 9/1993 | Kojima et al. .............. 285/112 |
| 5,271,648 A * | 12/1993 | Krausz ................... 285/419 X |
| 5,758,907 A | 6/1998 | Dole et al. ................... 285/112 |

FOREIGN PATENT DOCUMENTS

DE   3504978   *   8/1986   ................. 285/410

* cited by examiner

Primary Examiner—Lynne H. Browne
(74) Attorney, Agent, or Firm—Abelman, Frayne & Schwab

(57) ABSTRACT

A segmented pipe coupling includes traction bolts that permit movement of shanks of the traction bolts into an attitude in which the head and nut of the traction bolts engage their respective bolting faces in continuous engagement, thus to eliminate a drop in tensile stress in a shank of the traction bolt due to shifting of the head of the bolt or the nut subsequent to initial torquing down of the nut.

24 Claims, 8 Drawing Sheets

FIG.11
FIG.12
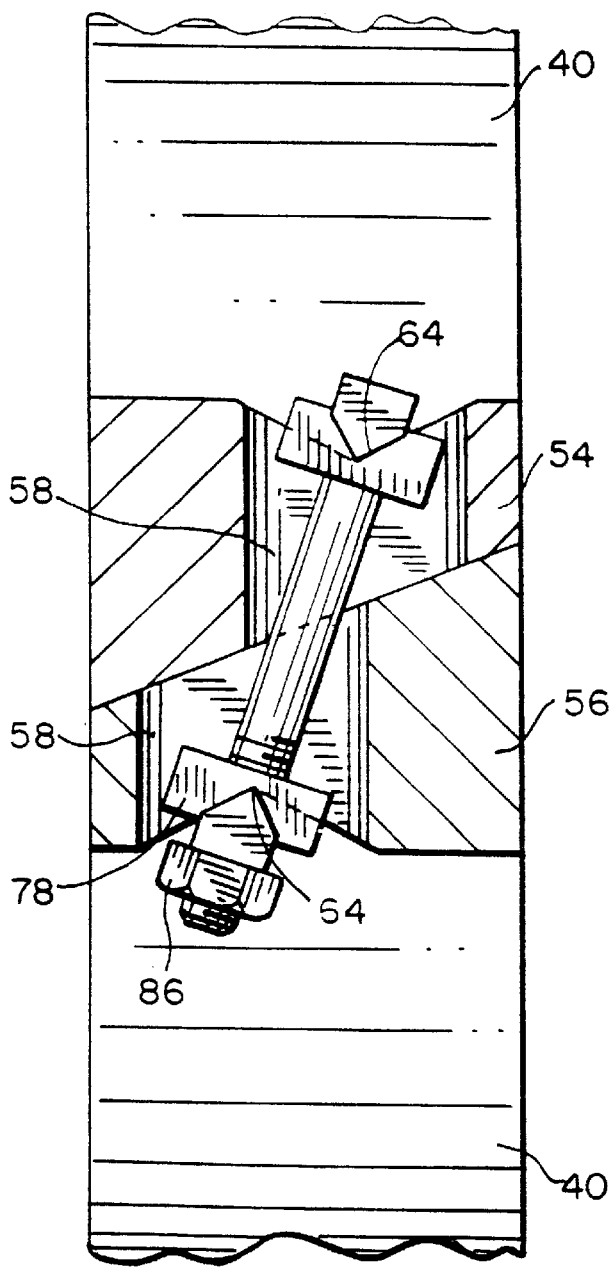
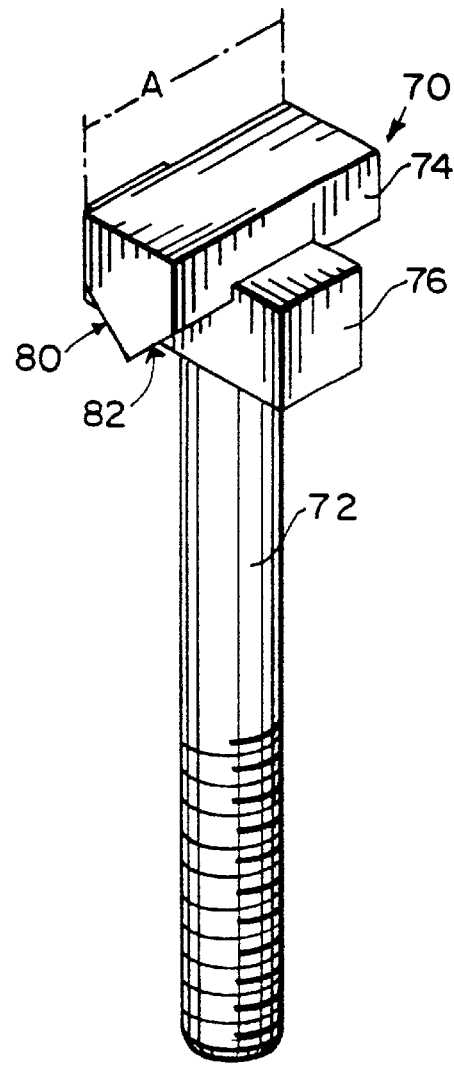

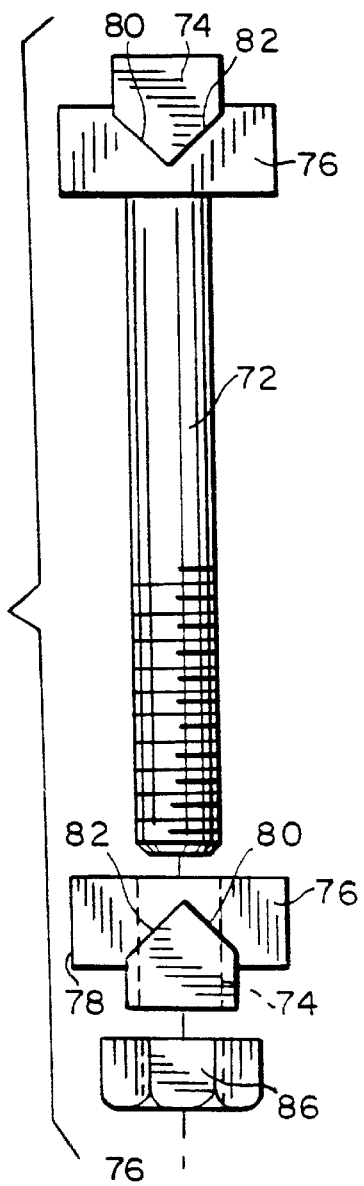
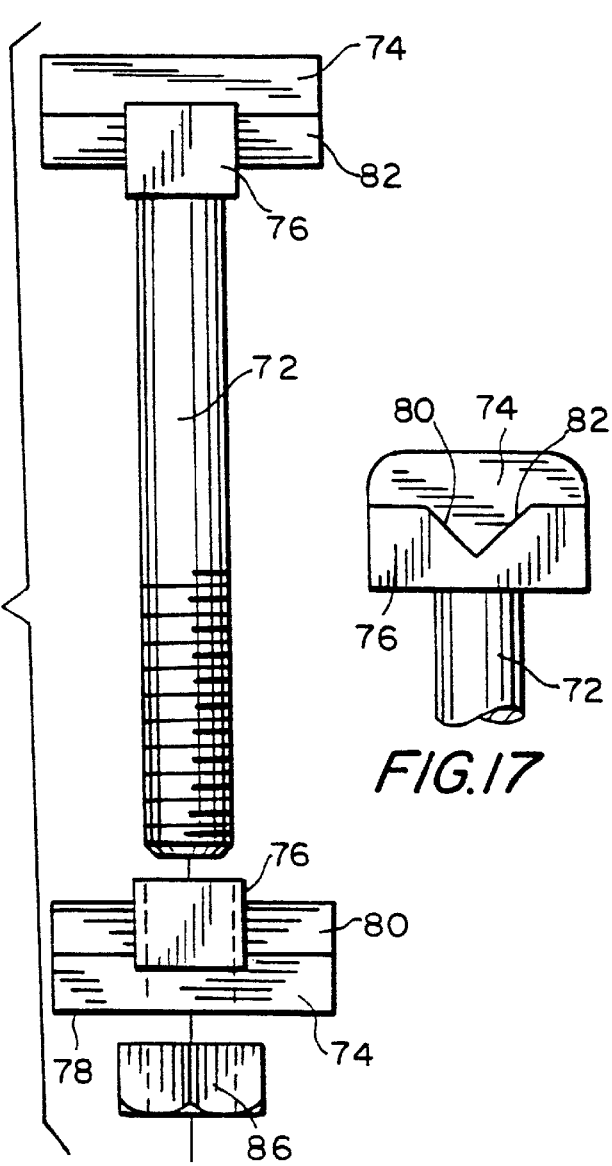
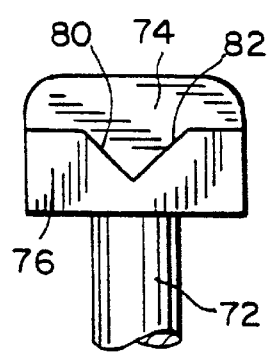
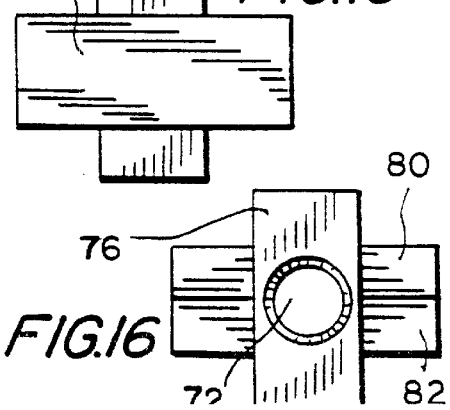
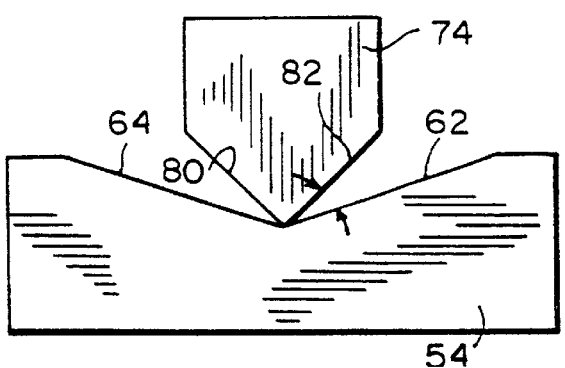

SEGMENTED PIPE COUPLINGS EMPLOYING T-BOLTS AND IMPROVED T-BOLTS THEREFOR

FIELD OF THE INVENTION

This invention relates to segmented pipe couplings, such couplings being comprised of two or more arcuate coupling segments having bolting pads at their respective ends enabling the coupling segments to be bolted to each other in encircling relation with a pipe or a fitting, the segmented pipe coupling being employed to connect adjacent ends of pipes to each other, or, to connect a fitting to a pipe, or to another fitting.

While not limited thereto, the present invention finds particular application in segmented pipe couplings that are employed to interconnect lengths of high-density polyurethane pipe, the present invention also finding application in segmented pipe couplings employed for interconnecting lengths of cut or roll grooved metal pipe, in which it is intended that the keys of the coupling segments engage the bottom wall of the groove throughout the entire arcuate extent of the respective coupling segments.

BACKGROUND OF THE INVENTION

Segmented pipe couplings are well-known in the art, including segmented pipe couplings having teeth extending circumferentially of the inner periphery thereof for biting and gripping engagement with the outer surface of a pipe.

The usual manner of securing the coupling segments to one another is by the use of traction bolts, which extend through apertures in adjacent bolting pads of a pair of coupling segments, the traction bolts having a head at one end that engages a bolting face of the associated bolting pad, the bolting face extending on a radius of the coupling segment, and either parallel to, or at an angle to a radial plane that includes the longitudinal axis of the coupling segment.

The other end of the traction bolt is threaded, for it to receive a nut, which similarly engages the associated bolting face of the next adjacent coupling segment, that bolting face extending either parallel to the bolting face of the next adjacent coupling segment, or, extending at an angle thereto, for the respective bolting faces to diverge and to define and include angle, and be other than truly parallel to one another.

Commonly bolt holes are provided in the bolting pads for the reception of a shank of the traction bolt, the shank of the traction bolt being inserted through the bolt holes in the adjacent bolting pads, subsequent to which the nut is applied to the shank of the traction bolt, and, the nut is then torqued down to draw the bolting pads of the respective coupling segments towards each other, and, in turn, to draw the assembled segmented pipe coupling into clamping engagement with the exterior of the associated pipes or fittings.

The coupling segments, while essentially being rigid, are capable of flexure to a limited extent in a direction to reduce the arcuate radius of the coupling segment, and, permit the coupling segment to extend in continuous engagement with the outer surface of the associated pipe or fitting.

This flexing movement is of particular value in segmented pipe couplings employed for interconnecting lengths of high-density polyurethane pipe [HDPE], the coupling segments being provided with teeth on their inner periphery which are to bite into the outer surface of the pipe, and thus anchor the segmented pipe coupling against movement axially of the associated pipe.

This capability of flexing of the coupling segments is employed to advantage in segmented pipe couplings that incorporate only two coupling segments, which each subtend an arc of a semi-circle. Provision must be made for positioning the internal teeth of the coupling segments over the pipe periphery prior to torquing down of the traction bolts, i.e., the radially inner surfaces of the teeth at the ends of the coupling segments must be spaced radially outwardly of the axis of the coupling segment by a distance that is equal to the radius of the outer surface of the pipe, in order to permit the coupling segment to be assembled over the pipe periphery. On torquing down of the pipe coupling, the respective ends of the respective coupling segments flex inwardly and are caused to move towards each other, in order to move the teeth at the ends of the coupling segments into biting engagement with the pipe exterior, the only other option being to relieve the teeth at the opposite ends of the coupling segment in a direction tangential to the radius of the coupling.

Segmented pipe couplings are known in which one end of the traction bolt is pivotally secured within the bolting pads of one of the coupling segments, and which can be swung into a position in which the nuts can be engaged with the bolting pads of the next adjacent coupling segment. Such a construction is disclosed in Stillwagon U.S. Pat. No. 2,459,251 issued Jan. 18, 1949, which, while intended for use with metal piping, also would find use in the coupling of high-density polyurethane piping.

In that construction, the ends of the bolts are pivotally mounted within the bolting pads of the associated coupling segment by providing hinge pins that extend through the bolt heads, and which are secured within the associated bolting pads.

In that construction, while the traction bolts and the bolting pads can hinge relative to each other, no provision is made for corresponding movement of the bolts relative to the bolting pads of the next adjacent coupling segment. Thus, in the event that the bolting face of the next adjacent coupling segment is not truly perpendicular to the axis of the shank of the bolt, but is inclined thereto, the nut will engage the bolting face of the associated bolting pad in essentially line contact extending radially of the bolt axis, i.e., the nuts will not be in continuous end face engagement with the bolting face of the bolting pad. This gives rise to the tensional forces existing in the bolt acting in a direction that is other than co-axial with the shank of the bolt, and which results in bending or attempted bending of the shank of the bolt.

Further problems arise as a result of the nut attempting to spiral along the associated bolting face as the nut is torqued down to the required value. However, at that time, the nut is attempting to bite into the associated bolting face at the location of line engagement, a circumstance which again militates against the nut reaching true parallelism with the associated bolting face.

The result is that under mechanical or thermal loading of the assembled pipes and segmented pipe coupling, the nut can move relative to its associated bolting face, and, it will attempt to do so in order to bring the operative face of the nut into continuous face engagement with the associated bolting face. This movement of the nut in an attempt to reach parallelism with the bolting face will result in a reduction in the tensile stress in the shank of the bolt, and in turn will result in a reduction in the clamping force exerted by the segmented pipe coupling on the associated pipes.

The positioning of a washer under the nut in no way removes this problem, in that the washer, during torquing down of the nut, becomes engaged with the associated bolting face with a very considerable resistance to movement of the washer relative to the bolting face.

It is also known to provide T-bolts in which the head of the bolt is integral with the shank instead of being pivotally interconnected with the shank. Such a construction is disclosed in Skelly U.S. Pat. No. 2,837,383 issued Jun. 3, 1958.

While the bolt of this reference overcomes the inherent requirement of providing a pivot pin at the bolt head, as is essential to the Stillwagon construction, the teachings of Skelly are not directly related to the employment of the Skelly construction in a segmented pipe coupling. While Skelly teaches a T-bolt having an integral head, a nut applied to the shank of the bolt, and a saddle that is capable of rotation relative to its supporting member, Skelly also requires that the saddle be channelled for it to extend around one half of the circumference of the bolt shank, which can result in the trunnions of the saddle moving out of axial alignment with one another under the effects of tensional loading of the shank of the bolt. This problem in Skelly is of little consequence in Skelly's construction, which, as previously mentioned, bears little relationship to the environment of a segmented pipe coupling.

In another form of coupling, as taught by U.S. Pat. No. 4,611,839, the adjacent ends of the respective coupling segments are intentionally required to move axially relative to each other in opposite directions during the torquing down of the traction bolts, in order to provide a segmented pipe coupling capable of maximizing the rigidity of the coupling when it is in a fully assembled condition.

Each of the above circumstances give rise to totally unexpected and uncontrollable conditions, and can result in a reduction of the tensile stress present in the traction bolts.

This is due to numerous variable conditions which arise during assembly of the coupling and during use of the coupling. Such variables arise when the shank of the bolt is unable to reach a condition in which its axis is truly perpendicular to the bolting faces of both of the bolting pads. In that event, maximum pressure will be exerted at one location circumferentially of the head of the traction bolt than is exerted at other locations around the circumference of the bolt head. If maximum pressure is exerted at one position on the bolt head, then a force will be present acting to move the head itself into a position in which it is other than perpendicular to the axis of the shank of the bolt, with an attempted ripping-off of the bolt head, and, which in turn resolves itself as bending or bowing of the shank of the traction bolt.

This problem is further exaggerated in the event that the nut does not extend in perfectly parallel relation relative to the bolting face of the opposite bolting pad, a condition which seldom occurs, and, which is not achievable in the event that the shank of the traction bolt has a bowed due to the conditions arising at the head of the bolt.

Further, the existence of extremely localized and extremely high pressures at a point on the circumference of the bolt head can result in the bolt head bedding down and becoming matrixed at that location into the somewhat rough surface of the as-cast bolting face. This, in turn, militates against the bolt head sliding relative to its associated bolting face into true parallelism with the associated bolting face.

The same condition arises at the nut, and at the washer in the event that a washer is employed, i.e., the localized extremely high pressures militate against the nut or the washer reorienting themselves in true parallelism with the associated bolting face.

In the event that a washer is not employed, then, a further problem arises. Unless the operative face of the nut is exactly in parallelism with its associated bolting face, and invariably it is not in such a position, the nut will attempt to spiral across the associated bolting face. That condition further acts to move the shank of the bolt out of its perpendicular relation to the oppositely presented bolting faces, further increasing the possibility of bowing of the shank of the nut, and acting even further to move the operative face of the nut out of parallelism with the associated bolting face.

Other variations can occur arising from manufacturing tolerances in the traction bolt and its associated nut, and, manufacturing tolerances in the coupling segments themselves arising from the casting process employed in the manufacture of the coupling segments.

Upon torquing down of the nut to the desired value, a positive indication will be given that the traction bolt is properly and fully torqued down to the intended value. At the immediate time the torque value is initially established, possibly this is so. However, the presence of so many variables can later result in the torque value being significantly reduced. If the traction bolt moves from the initial position at which the required torque value was obtained to another position, then, the tensile stress in the shank of the bolt can become reduced. This can happen due to mechanical loading exerted on the associated pipes, or thermal working due to temperature variations in the pipes and in the couplings, or due to cold working of the metal comprising the bolt head and the associated nut, and, in extreme circumstances can arise from angling of the bolt head relative to the bolt shank for the operative face of the bolt head to become other than truly perpendicular to the longitudinal axis of the bolt shank.

A further problem that can occur with conventional traction bolts is that the end of the shank of the traction bolt can move laterally within the bolt hole of the associated bolting pad to a position in which the shank, and probably the threaded portion of the shank is forced into engagement with the side wall of the bolt hole, particularly in the vicinity of the nut. If this happens, then a resultant error occurs in the value to which the nut is torqued down onto the associated bolting face. This is due to the fact that frictional engagement then exists between the shank of the bolt and the associated wall of the associated bolting head, which can cause scuffing and abrasion of the side wall of the bolt hole or of the shank of the bolt, particularly in view of the fact that the shank of the bolt and the bolting head of the associated coupling segment are moving relative to each other during the closing down of the bolting heads of the respective coupling segments. Having obtained an accurate, but in fact, false reading of the torque value, subsequent movement of the traction bolt relative to the bolt hole of the associated bolting pad can result in the frictional engagement disappearing, at which point the value to which the nut is torqued down correspondingly decreases.

Additional variations in the value to which the traction bolt is torqued down can arise due to crushing-down of the surface of the as-cast bolting pads, as an alternative to cold-working of the bolt head or the associated face of the associated nut. While that condition cannot be eliminated in its entirety, it is significantly reduced in the event that the forces exerted between the traction bolts and the respective bolting pads can be equalized to the greatest possible extent.

Any reduction in the extent to which the traction bolt is torqued down then can result in a reduction in the force with which the respective coupling segments engage the associated pipes or fittings, thus resulting in the coupling exhibiting reduced capability in providing a truly rigid coupling.

OBJECT OF THE INVENTION

It is an object of this invention to provide a traction bolt that will eliminate or significantly reduce the problems resulting from use of conventional traction bolts.

It is a further object of this invention to provide a segmented pipe coupling employing traction bolts, that can predictably maintain the clamping pressure to which it is initially subjected, and, in which the desired clamping pressure is substantially unaffected by conditions that occur subsequent to the clamping down of the respective coupling segments.

It is a further object of this invention to provide a traction bolt in which the stresses exerted in the shank of the traction bolt predictably are tensile stresses acting in parallelism with the longitudinal axis of the shank of the traction bolt, thus to militate against bowing of the shank of the traction bolt under the applied traction forces.

It is a further object of this invention to reduce or eliminate the consequences of spiralling of the nut relative to its associated bolting face, and, the consequences of scuffing, abrasion, and frictional resistance resulting from relative movement between the shank of the traction bolt and the associated wall of the bolt hole of the associated bolting pad.

It is a further object of this invention to eliminate the effects of movements of the bolting faces of the respective bolting pads towards or out of parallelism with one another during torqueing down of the coupling segments of the segmented pipe coupling.

It is another object of this invention to provide a segmented pipe coupling in which the extent of torqueing down of the respective traction bolts, and the clamping pressures exerted by the respective coupling segments, can predictably be maintained in the presence of mechanical or thermal stresses applied to the assembled segmented pipe coupling.

It is also an object of this invention to provide a segmented pipe coupling and traction bolt assembly, in which the traction bolt is subjected exclusively to tensional forces extending parallel to the axis of the bolt shank, and which thus will accommodate situations in which the respective bolting faces are other than truly perpendicular to the longitudinal axis of the coupling segment.

SUMMARY OF THE INVENTION

According to the present invention, the segmented pipe coupling and T-bolt combination provides a seating for the head of the T-bolt, which permits rotary movement of the T-bolt about the longitudinal axis of the head of the T-bolt, the head of the T-bolt being formed as a cylinder or knife edge.

The mutually presented bolting head of the next adjacent segmented pipe coupling is provided with bolt holes of a diameter larger than the diameter of the bolt shank, in order that the bolt shank is free to move within the bolt holes by swinging about the longitudinal axis of the head of the T-bolt.

In this manner, when the nut is applied to the shank of the T-bolt, the nut automatically will come into complete face engagement with the bolting face of its associated bolting pad, the T-bolt being free to rotate about the longitudinal axis of the bolt head. In this manner, it is assured that bending forces in the shank of the bolt are eliminated, and, that the operative face of the bolt reaches continuous face engagement with the face of the associated bolting pad, despite the probability that the respective bolting faces are not in true parallelism with each other and extending a truly paralleled to a radial plane that includes the longitudinal axis of the coupling segment.

According to another embodiment of the present invention, a T-bolt having a head integral with the shank of the bolt is pivotally supported in one of the bolting pads, and a yoke-shaped saddle is positioned on the shank of the bolt, and which can move axially of the bolt. The saddle is held in position by a nut which engages the saddle, the saddle being formed in a similar manner to the head of the traction bolt in order that it can pivot relative to the bolting pad of the next adjacent coupling segment.

By this construction, tensional forces applied to the shank of the bolt automatically act to rotate the head of the T-bolt and the saddle relative to their associated bolting pads, in order to ensure that the nut engages the face of the saddle in continuous face engagement as opposed to line-engagement, thus to relieve the shank of any bending forces developed in the shank.

By virtue of the capability of the nut to engage the saddle in continuous face engagement and the ability of the head of the T-bolt to rotate relative to its associated bolting pad, there is no possibility of the nut engaging the saddle in line-engagement, and in turn, there is no possibility of the nut moving relative to the saddle under mechanical or thermal loading, thus to provide a traction bolt for a segmented pipe coupling that predictably can be torqued down to the required extent, and in which the tensional loading of the bolt shank predictably will be maintained in the presence of mechanical or thermal working of the segmented pipe coupling and the associated pipes to which it is applied.

DESCRIPTION OF THE DRAWINGS

The invention will now be described with reference to the accompanying drawings, which illustrate a preferred embodiment of the invention, and in which:

FIG. 11 is a cross-sectional view through the bolting pads of the coupling of FIG. 10 taken along the line 11/11 in FIG. 10;

FIG. 12 is a perspective view of a novel form of traction bolt employed in the construction of FIG. 11, and which also can be employed in the constructions of FIGS. 4 through 7;

FIG. 13 is an exploded view of the bolt, saddle and nut combination of FIG. 11 in a frontal view;

FIG. 14 is a corresponding side view of FIG. 13;

FIG. 15 is a top view of the bolt head of FIG. 14;

FIG. 16 is a top view of the saddle of FIG. 14;

FIG. 17 is illustrative of a modification in the shape of the bolt head of FIG. 13; and, FIG. 18 is a diagrammatic view illustrating the advantages of the bolt of the present invention.

DESCRIPTION OF THE PRIOR ART

Figure 1:
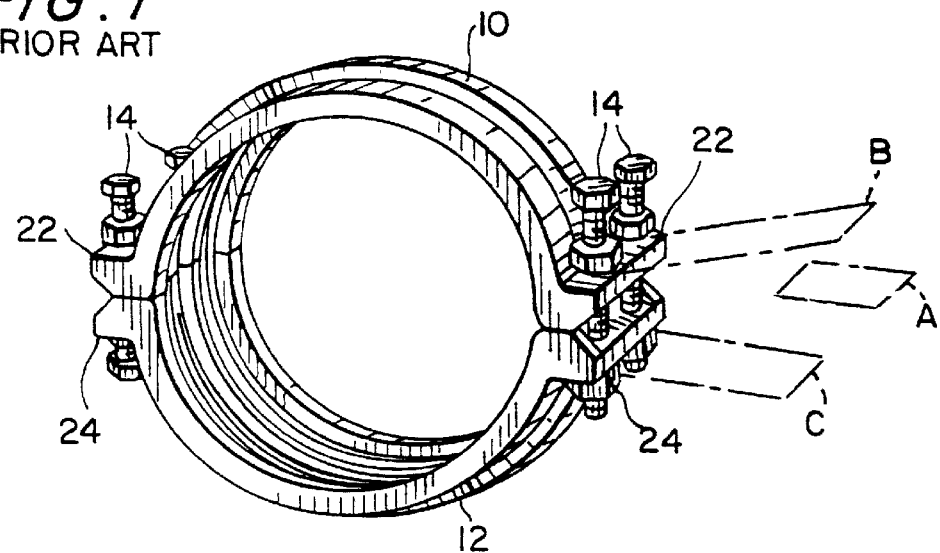
FIG. 1 is an illustration of a prior art coupling of the type employed for joining lengths of plastics pipe to one another, and, which relies on internal teeth on the respective coupling segments to provide a biting engagement with the pipe exterior upon tightening down of the associated traction bolts.

Referring firstly to FIG. 1, a segmented pipe coupling for use on plastic piping is illustrated, that coupling including two coupling segments 10 and 12 that are secured to each other by traction bolts 14.

Figure 2:
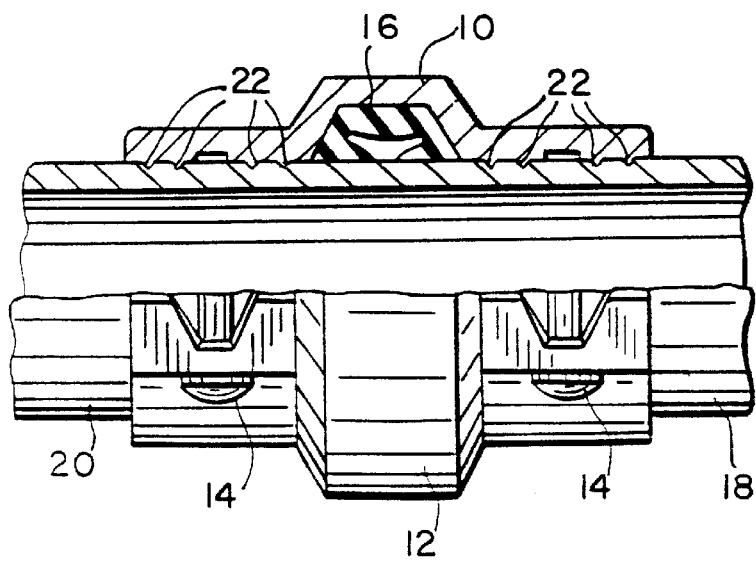
FIG. 2 is a partial cross-section through the prior art coupling of FIG. 1.

As illustrated in FIG. 2, the segmented pipe coupling includes a sealing member 16 that bridges the adjacent ends of pipes 18 and 20 that are secured to each other by the respective coupling segments 10 and 12.

Figure 8:
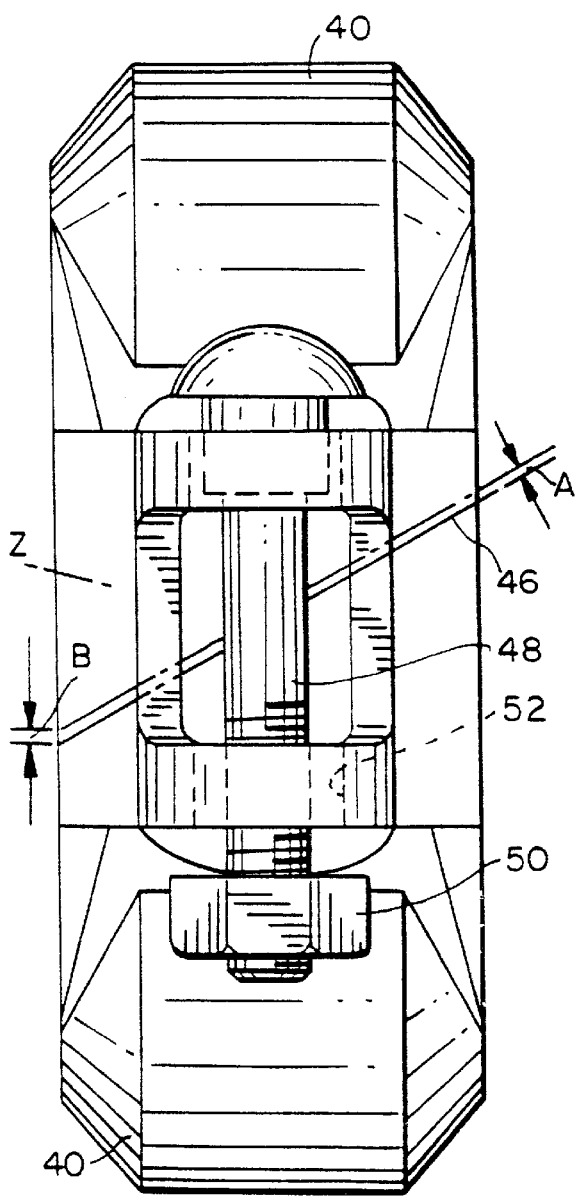
FIGS. 8 and 9 are illustrative of a prior art coupling as disclosed in U.S. Pat. No. 4,611,839, in which the respective coupling halves intentionally are required to move oppositely to one another.
Figure 9:
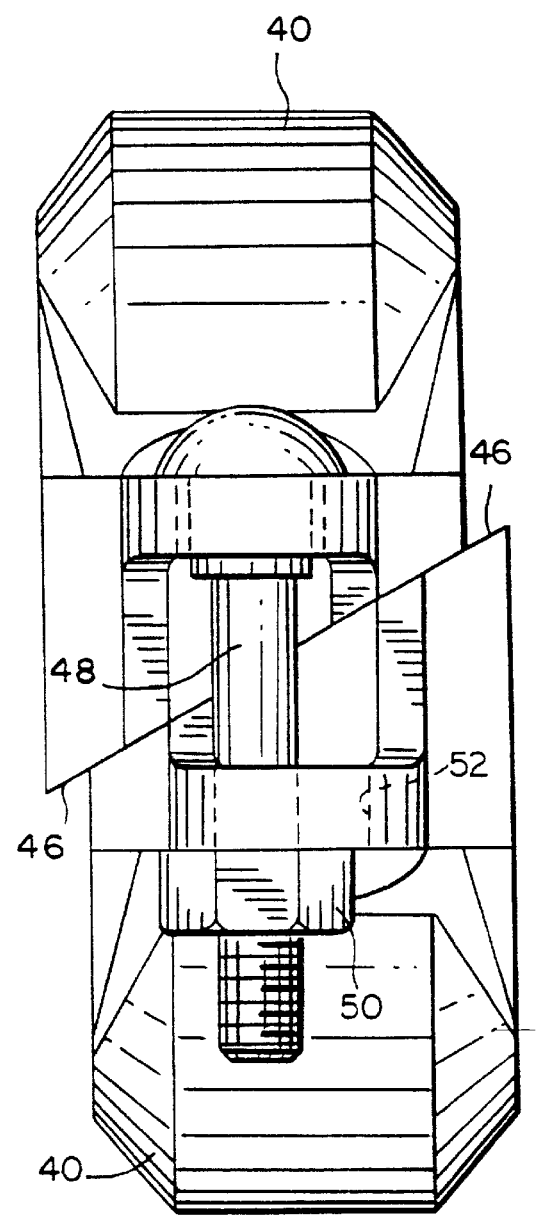

In the alternative, and as shown in FIGS. 8 and 9, coupling segments are provided which move oppositely relative to each other on torqueing down of the traction bolts in order to provide a rigid coupling for metal pipes having cut grooves.

As is illustrated in FIG. 2, the inner circumference of the respective coupling segments 10 and 12 are provided with teeth 21 for biting engagement with the pipe periphery upon tightening down of the segmented pipe coupling.

In this known construction, it is arranged for the bolting faces 22 and 24 at the opposite ends of the respective coupling segments 10 and 12 to diverge from one another in a radially outwards direction relative to a truly horizontal plane A, as illustrated in FIG. 1 at B and C.

This is done in order to ensure that upon tightening down of the coupling, the respective coupling segments 10 and 12 will flex in order to reduce the original radius of the coupling segments, and cause the teeth 22 to bite into the outer periphery of the associated pipe 18 or 20 during tightening down of the coupling.

By reason that the bolting faces 22 and 24 do not extend in parallelism with one another, it follows that the head of the respective bolts or the operative face of the associated nuts cannot engage the bolting faces in continuous face engagement extending circumferentially of the operative face of the bolt head and the operative face of the nut. Instead, either or both the operative face of the bolt head and the operative face of the nut will be canted relative to the associated bolting face, this resulting in either or both the operative face of the bolt head and the operative face of the nut engaging its associated bolting face at only one position circumferentially of the operative face of the bolt head or the operative face of the nut.

Torqueing down of the nut when the bolt head and the nut are in this canted position, while producing the required tensile stress extending longitudinally of the bolt, will also produce bowing or bending of the shank of the bolt, or, the generation of forces acting to produce such bowing or bending of the bolt shank.

If the bolt head engages its associated bolting face at only one position circumferentially of the operative face of the bolt head, and similarly, the nut engages its associated bolting face at only one position spaced circumferentially of the operative face of the nut, then there is a force acting to bed down the head of the bolt at the position of engagement with the bolting face, and also, there is a tendency for the nut to bed down at the point of engagement of the nut with the bolting face.

The nut will, however, during its rotation during the torquing down operation, attempt to move in a spiral fashion along its associated bolting face. Thus, in the event that the operative face of the bolt is in true parallelism with its associated bolting face, a force will be produced acting to bow or bend the shank of the bolt.

In the event that the operative face of the head of the bolt and the operative face of the nut are not in continuous face engagement with their associated bolting faces, there then exists the option of them moving into that position under the influence of mechanical stresses applied to the coupling, or, thermal stresses applied to the coupling.

If the operative face of the bolt head and the operative face of the nut are in other than in continuous face engagement with their associated bolting faces, and, stresses arise that result in the respective operative faces moving into parallelism with the respective bolting faces, this will produce a drop in the intended tension in the shank of the bolt, and, in turn will produce a drop in the clamping force exerted by the coupling segments on the associated pipes.

Figure 3:
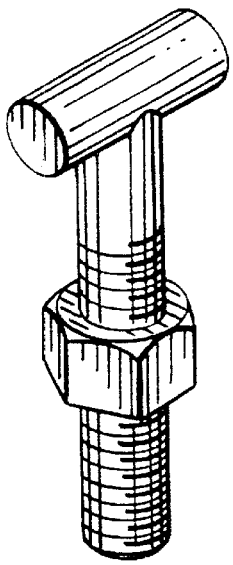
FIG. 3 is an illustration of a prior art T-bolt.

The present invention proposes to eliminate these problems by employing a T-bolt as illustrated in FIG. 3, and which is well-known in the prior art in substitution for the traction bolts presently employed in segmented pipe couplings.

DESCRIPTION OF THE PREFERRED EMBODIMENTS

The invention will now be described with reference to FIGS. 4 and 5 of the accompanying drawings and the alternative embodiment illustrated in FIGS. 6 and 7 of the accompanying drawings.

Figure 4:
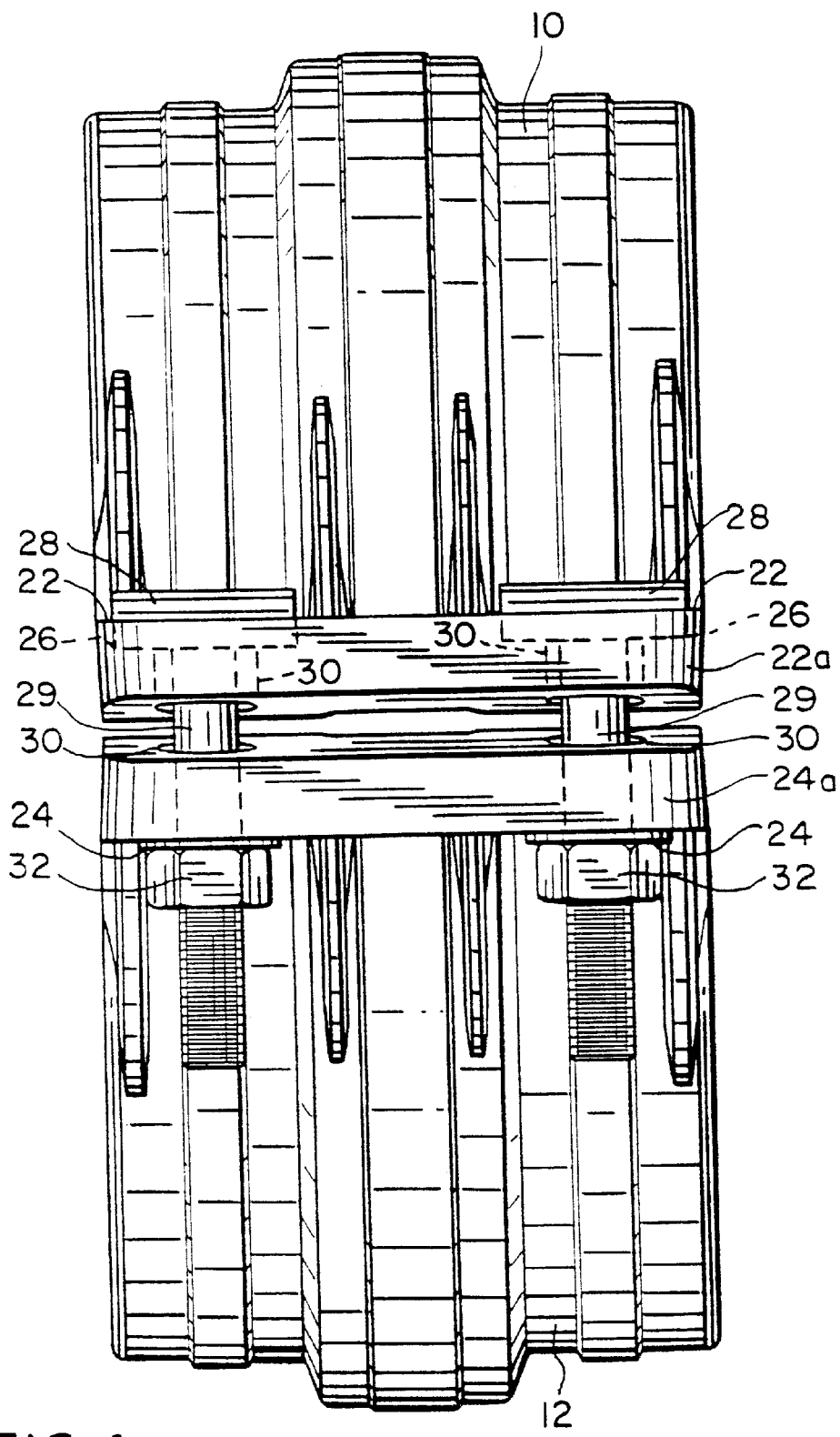
FIG. 4 is a front elevation of a segmented pipe coupling employing the known T-bolts for securing the coupling segments to one another.
Figure 5:
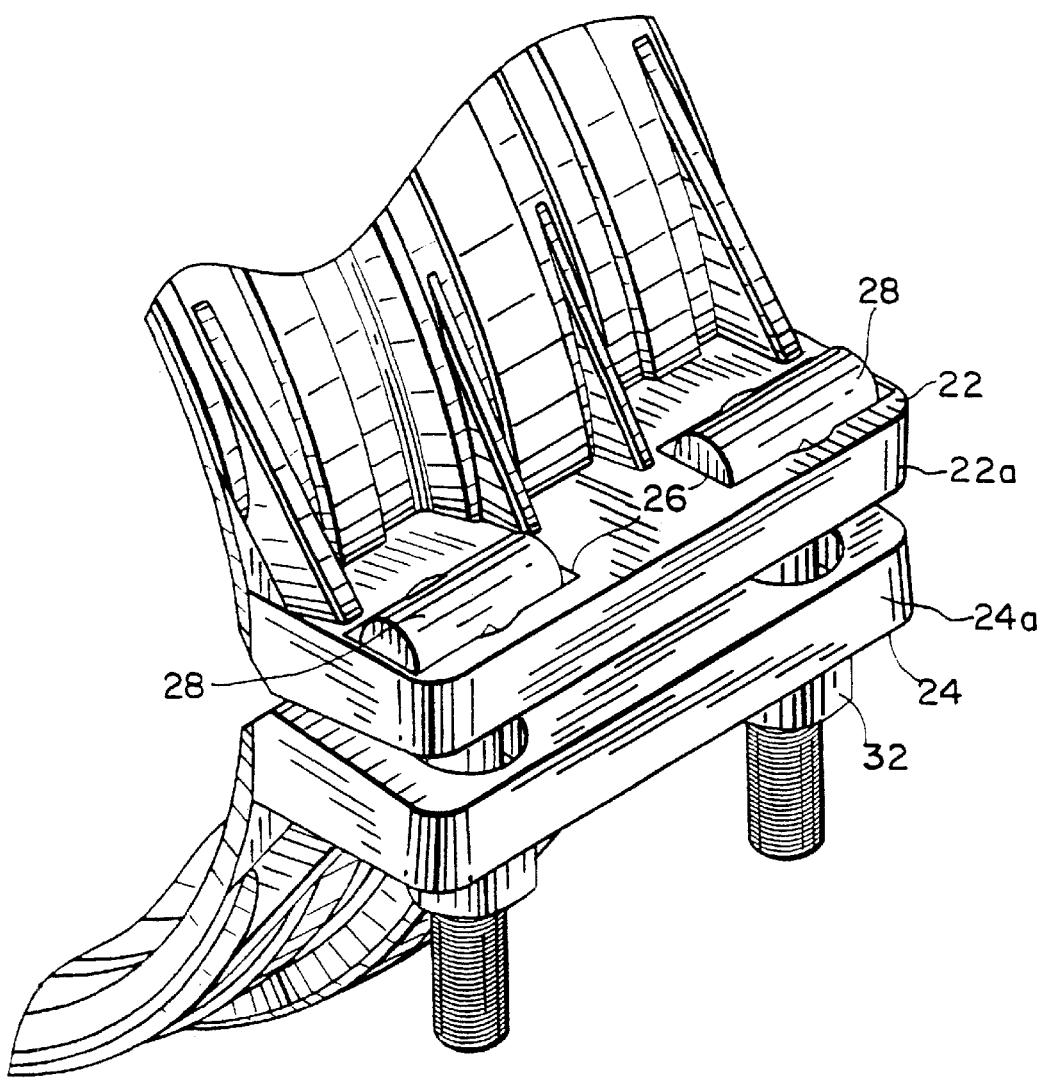
FIG. 5 is a perspective view of FIG. 4.

Referring now to FIGS. 4 and 5, which illustrate a segmented pipe coupling comprised of two coupling segments 10 and 12, the bolting face 22 of the coupling segment 10, which comprises the upper surface of the bolting pad 22a is recessed at 26 for it to provide a cradle for a head 28 integral with a shank 29 of a T-bolt, the head 28 being cylindrical in cross-section and extending perpendicular to the axis of the shank of the bolt 29.

The shank of the bolt 29 extends freely through bolt holes 30 provided in the bolting pads 22a and 24a, such that the shank of the bolt has limited play within the bolt holes 30 of the respective bolting pads.

Thus, when the T-bolts 29 are inserted into the bolt holes 30 and the cylindrical heads properly oriented for them to be received within the recesses 26, the T-bolts are free to swing about the axis of the heads in order that the operative face of the nut 32 can move into continuous face engagement with the associated bolting face 24 of the bolting pad 24a.

The bolting faces 22 and 24 normally will extend in parallelism with each other in the direction of the longitudinal axis of the respective coupling segments, this being arranged for in the casting of the respective coupling segments. The probability is that the respective bolting faces will not be truly parallel to a radial plane including the longitudinal axis of the coupling segments. The assembly automatically compensates for any deviation of the attitude of the bolting faces relative to the radial plane including the longitudinal axis of the coupling segments by permitting swinging of the bolts to a position in which the operative face of the nut is in true continuous face engagement with its associated bolting face, the head of the bolt having swung about the longitudinal axis of the bolt, while at the same time maintaining continuous face engagement of the bolt head with the associated bolting face.

Having reached that condition, there is no opportunity for shifting of the bolt head or the nut relative to the associated bolting faces, which in turn ensures that mechanical or thermal working of the pipes and coupling cannot result in a reduction in the tension applied to the bolt shank, and thus, the force acting to hold the bolting faces in their final position of adjustment subsequent to torquing down of the bolts.

A further improvement can be effected by adopting the structure now described with reference to FIGS. 6 and 7 of the accompanying drawings.

Figure 6:
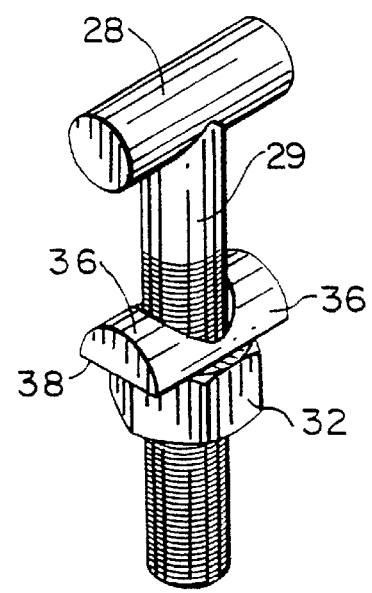
FIG. 6 is a perspective view illustrating a T-bolt and saddle assembly according to the present invention, and, FIG. 7 is a partially cross-sectional view of the coupling of FIG. 4 embodying the traction bolts of FIG. 6.
Figure 7:
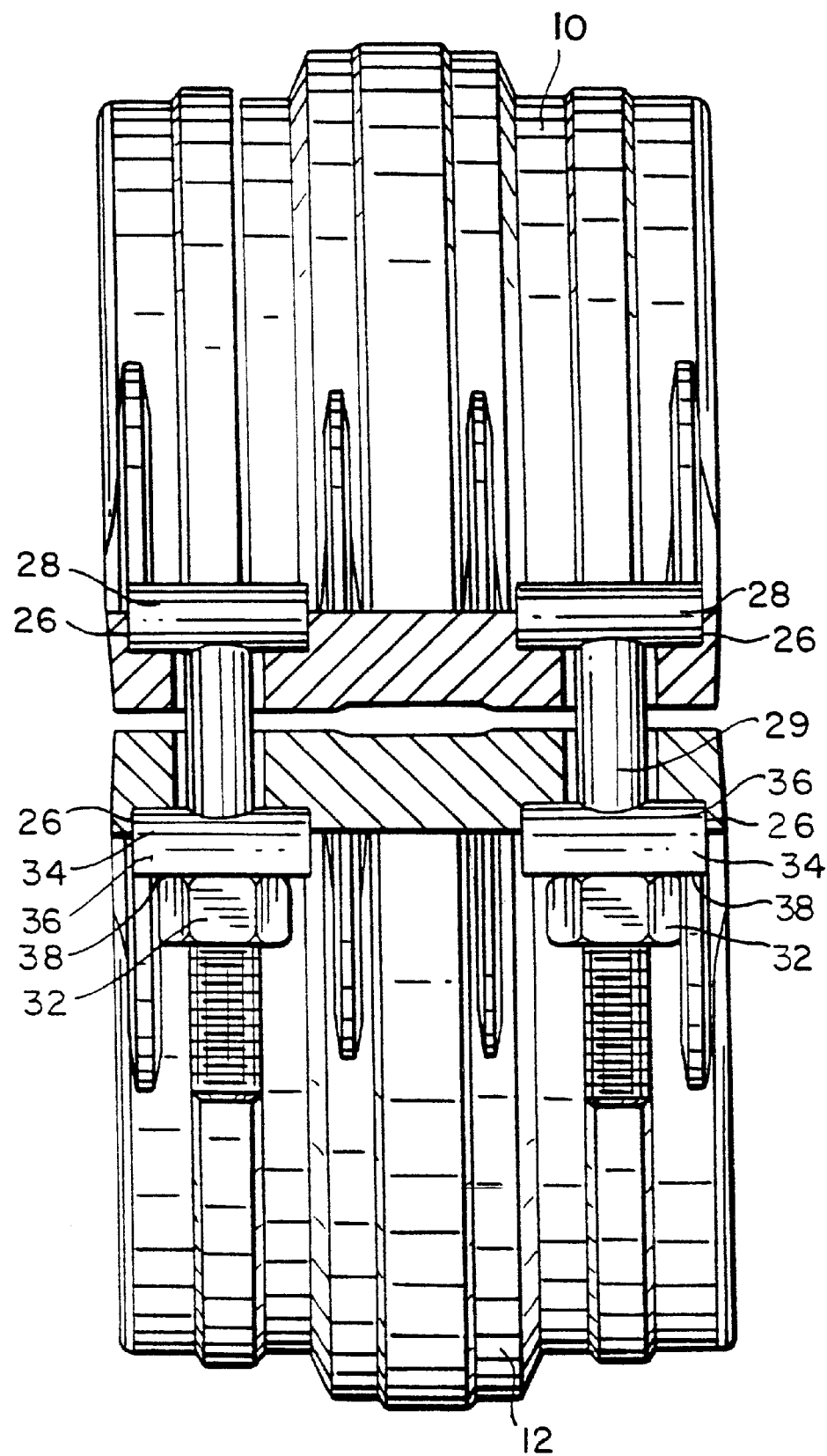

As is illustrated more clearly in FIG. 6, the bolt 29 is provided with a yoke-shaped saddle 34 having an upper surface 36 that is a surface of a cylinder and a lower surface 38 that provides a planar surface against which the operative face of the nut can react.

By this modification, a dual swinging action is provided between the head 28 of the bolt and also the saddle 34, which at all time ensures that the operative face of the nut is in continuous face engagement with the planar lower surface 38 of the saddle 34, thus to eliminate the effects of spiralling of the nut across the associated bolting face as the nut is torqued down. This in turn eliminates the effects of spiralling of the nut relative to its associated bolting face, and, the concomitant drop in tensile stress in the shank of the bolt in the event that the nut returns to face engagement with the associated bolting face due to mechanical or thermal working of the coupling and the associated pipes.

Alternative geometry in the operative faces of the bolt head and the saddle will be obvious to persons skilled in the art. For example, instead of providing surfaces of a cylinder, the bolt head, and the bolt head and the operative face of the saddle can be formed as surfaces of a sphere, in this manner providing for omni-directional swinging of the bolt shank in directions parallel to the axis of the coupling segments, and also, in directions lateral to that plane, thus to provide a universal swinging interconnection between the respective bolting pads.

DESCRIPTION OF AN ALTERNATIVE PREFERRED EMBODIMENT

FIGS. 4 through 7 each have related to a segmented pipe coupling in which the coupling segments are intended to flex inwardly in order for the internal radius of the respective coupling segments to be reduced, and in order to permit continuous clamping circumferentially of the coupling segment onto the exterior of a pipe.

FIGS. 8 through 18 relate to a different construction of segmented pipe coupling, such as is shown in U.S. Pat. No. 4,611,839.

Referring now to FIGS. 8 and 9, which illustrate one of the embodiments of the aforementioned prior art coupling, the respective coupling segments 40 each are provided with an inclined end face that is intended to engage the corresponding end face of the adjacent coupling, and which, when the traction bolts 48 are torqued down by means of the nut 50 are possibly slid laterally relative to each other.

To enable this to happen, the bolting pads of the respective coupling segments are provided with oblate bolt holes 52, i.e., bolt holes that are longer in the direction of the axis of the coupling segments than they are in a direction radially of the coupling segments.

This construction of coupling give rise to exactly the same problems as those previously described, and which can result in a loss of tension in the traction bolt due to mechanical or thermal working of the coupling and the associated pipes, in the event that the head of the bolt is other than in continuous face engagement with its associated bolting pad, or, the nut is other than in continuous face engagement with the bolting pad associated with the nut, for the same reasons as those previously described.

To overcome this problem, the present invention teaches modifications in the form of the traction bolt, and optionally modifications in the shape of the bolting faces of the bolting pads.

Additionally, this modification of the present invention provides a traction bolt that can engage its associated bolting face in line engagement, thus to provide for friction-free swinging movement of the traction bolt, and also of the saddle to be associated with the traction bolt.

A suitable modification of the bolting pads 54 and 56 is now described with reference to FIG. 10.

Figure 10:
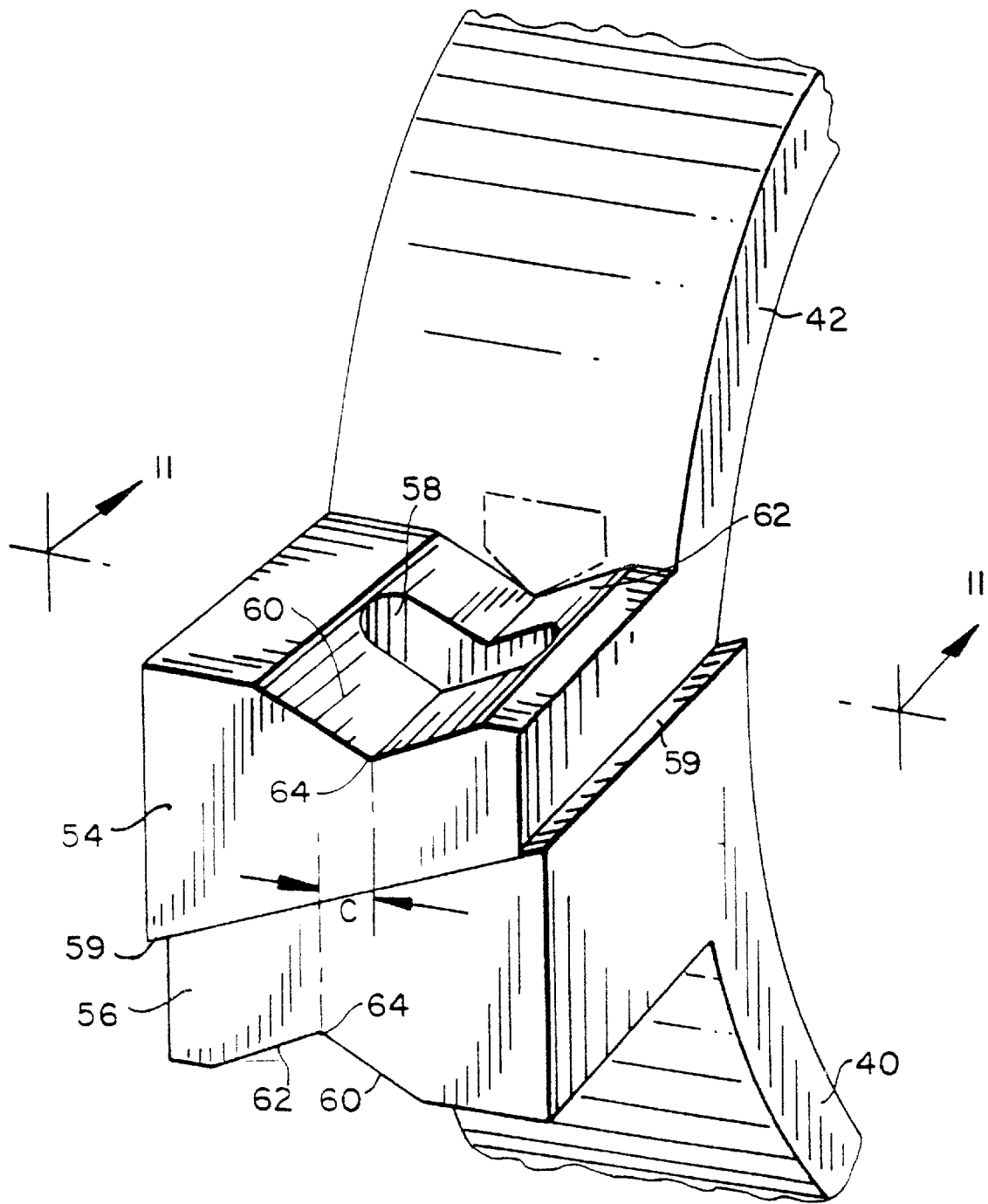
FIG. 10 is a fragmentary perspective view showing a modification in the bolting pads of the coupling of FIGS. 8 and 9.

In FIG. 10, the bolting pads 54 and 56 each have inclined end faces 59, thus to permit the respective bolting pads 54 and 56 to move oppositely relative to each other on tightening down of the coupling.

The bolting pads 54 and 56 each are provided with an oblate bolt hole 58 that is longer in the direction of the longitudinal axis of the coupling than its width in a direction radially of the coupling.

The oblate bolt hole 58 extends through inclined bolting faces 60 and 62.

The intersection of the bolting faces 60 and 62 are located off-center at 64 relative to the bolting pads 54 and 56, such that when the respective bolting pads are presented in face to face relation with each other, the intersections 64 are spaced axially of the longitudinal axis of the coupling by a distance C.

In all other respects, the coupling segments and their associated bolting pads can be configured in any of the manners well known in the art.

The reason for offsetting the intersections 64 of the respective bolting pads will now be described with reference to FIGS. 11 and 12, FIG. 11 showing that the modified traction bolt of FIG. 12 when incorporated into the structure shown in FIG. 10.

In FIG. 11, instead of employing a conventional traction bolt having a flat operative face and a conventional nut having a flat operative flat, use is made of a modified form of traction bolt as shown in FIG. 12, and as is more fully described with reference to FIGS. 13 through 18.

The modified traction bolt as indicated generally at 70 includes a shank 72 that is threaded at one of its ends, and which terminates at the opposite end in a head 74 having a V-shaped lower face, the apex of the V extending perpendicular to the longitudinal axis of the shank, and extending in a straight line formation to both sides of the axis of the shank as a diameter thereof.

Immediately underlying the bolt head 74 is a boss 76 of a dimension and configuration for it to be received within an associated oblate bolting hole 58 with a sufficient clearance to permit ready movement of the boss 76 within the associated oblate bolting hole 58.

As is later described with reference to FIGS. 13 through 18, a saddle 78 that is slidable axially of the shank 72 is provided at the threaded end of the shank 72, and is secured thereon by means of a conventional nut.

As is later more clearly described with reference to FIG. 18, the bolting faces 60 and 62 of the bolting pads 54 and 56 subtend an angle greater than the angle subtended by the inclined end faces 80 and 82 of the bolt head 74.

Thus, the operative faces of the bolt head, and also the operative faces of the saddle 78 engage the associated inclined bolting faces 60 and 62 of the respective bolting pads substantially in line engagement, and thus, are capable of pivoting in the manner of a knife-edge along axes that extend parallel to each other and perpendicular to a plane that includes the longitudinal axis of the associated coupling member.

Thus, upon movement of the coupling segments 40 in opposite directions relative to each other axially of the coupling, the inclined end faces 80 and 82 are free to move angularly with respect to the associated bolting pads, to provide what is essentially a frictionless swinging link that is capable of relieving any bending stresses that might be exerted on the bolt shank, and which also eliminate in their entirety the effects of point contact with the associated bolting pad of a conventional traction bolt and nut assembly.

A major advantage of this construction is that an uninformed or careless workman cannot assemble the bolt incorrectly in relation to the bolting pads, and if he attempts to do so will be given an immediate visual indication that the bolt has been incorrectly assembled to the bolting faces.

The boss 76 has a width slightly less than the width of the oblate bolting hole 58, and has a length less than the length of the oblate bolting hole 58. Thus, the boss 76 of the traction bolt 70 and also, the boss of the saddle can only enter their associated bolting holes 58 when the bolt head 74 is correctly oriented relative to the associated bolting pad.

The bolt head 74 and that of the saddle 78 each have a length greatly in excess of the width of the bolting holes 58, the only orientation of the bolt head possible being in alignment with the intersection 64 of the inclined bolting faces 60 and 62 of the respective bolting pads. The construction of the bolt 70 and its associated saddle 78 is more clearly illustrated in FIGS. 13 through 16.

As will be seen, the boss 76 is of greater axial length than the width of the bolt head 74, and, in turn, the boss 76 is of considerably lesser width than the length of the bolt head 74, the boss 76 being of greater length than the diameter of the shank 72, and being of approximately the same width as that of the shank 72.

Similarly, in the saddle 78, the boss 76 is of greater length than the width of the head 74, and the head 74 is of considerably greater length than the width of the boss 76, this configuration ensuring that the bolt head and the saddle will be assembled onto the bolting heads in a correct orientation, its being impossible to position the bolt head and the saddle in an incorrect position. If an attempt is made in that respect, then, insufficient amount of the threaded shank 72 will be available to permit threading onto the shank 72 of the lock nut 86.

Referring now to FIG. 18, the inclination of the end faces 82 of the bolt heads 74 in relation to the inclined bolting faces 60 and 62 is illustrated with greater clarity, to illustrate the substantially frictionless engagement of the bolt head or the saddle with its associated bolting pad.

By offsetting the intersection of the inclined bolting faces 60 and 62 as illustrated in FIG. 10, then, without regard to the positions to which the respective coupling segments have shifted, the shank of the bolt is exclusively subjected to tensional forces to the total elimination of any lateral forces acting to bow or bend the shank of the bolt.

Further, there is no possibility of the head of the bolt shifting from the position in which it is torqued down, there is no possibility of the saddle shifting from the position in which it is torqued down, and it is ensured that the operative face of the nut is at all times in continuous face engagement with the saddle 74.

Each of these factors ensure that subsequent to torquing down of the traction bolt, mechanical or thermal stresses applied to the coupling and its associated pipes are inoperative to produce any shifting of the bolt head, saddle or nut that could cause a reduction in the tensile force that has been generated in the shank of the bolt.

By suitable modification of the bolting pads, the bolt of the present invention can be employed in the constructions of FIGS. 4 through 7.

Further, in the constructions of FIGS. 4 through 7, line engagement between the head of the bolt and of the associated saddle can be produced by making the curved surfaces of the bolt head and saddle of lesser radius than the curvature of the recesses 26.

Other configurations of bolt head and saddle that produce virtually 0 friction will be apparent to those skilled in the art, including modifications of the head of the bolt as illustrated in FIG. 17 that are operative to further increase the rigidity of the bolt head 74.

What we claim is:

1. A segmented pipe coupling, including;

plural coupling segments having a bolting pad at each end of said coupling segments for bolting interconnection with an adjacent bolting pad of an adjacent coupling segment;

said bolting pads each providing a bolting face;

at least one of said bolting pads including a recess in said bolting face for the reception of a head of a T-bolt, said recess having two end faces;

apertures in said bolting pads permitting the insertion of a shank of a bolt through said apertures;

a T-bolt associated with each pair of adjacent bolting pads and having a generally cylindrical head and a shank, a longitudinal axis of said head extending substantially perpendicular to a longitudinal axis of said shank, said shank being inserted into and extending through said adjacent bolting pads;

said head of said T-bolt defining a pivotal axis and receivable within said recess in said associated bolting face, said recess defining a corresponding pivotal axis, said head having end faces positionable opposite said respective end faces of said recess;

said shank of said bolt being threaded;

a member slidable longitudinally of said shank and an adjacent bolting pad and having a first surface portion engageable with a correspondingly configured surface portion of said adjacent bolting pad, and an opposite substantially planar face; and a nut threaded onto said threaded shank and having an operative face for operative surface engagement with said substantially planar face of said slidable member in a manner to interconnect said bolting pads;

so that said shank can move relative to said associated bolting pads into a position in which an operative surface portion of said head and an operative surface portion of said nut are in continuous face engagement with the respective associated adjacent operative surfaces to maintain said coupling segments in interconnected relation, and said end faces of said recess provide resistance to rotation of said end faces of said head.

2. The segmented pipe coupling of claim 1, wherein said slidable member is a saddle slidable longitudinally of said shank, and engageable by said nut, said first surface portion of said saddle member being a surface of revolution, said adjacent bolting face being provided with a corresponding recess having a surface of revolution corresponding with that of said saddle for reception thereof.

3. The segmented pipe coupling of claim 2, in which said surface of revolution for engagement by said surface of revolution of said saddle extends parallel to said surface of revolution engageable by said surface of revolution of said head of said T-bolt.

4. The segmented pipe coupling of claim 3, in which said surface of revolution of said saddle is a surface of a cylinder.

5. The segmented pipe coupling of claim 2, in which said surface of revolution of said adjacent bolting face is a surface of a sphere.

6. The segmented pipe coupling of claim 2, in which said surface of revolution of said saddle is a surface of a cylinder.

7. The segmented pipe coupling of claim 1, in which said bolt head defines a knife edge defining the pivotal axis thereof.

8. A segmented pipe coupling, which comprises:
   a) at least two coupling segments having a bolting pad at each end for bolting interconnection with an adjacent bolting pad of an adjacent coupling segment, at least one of said bolting pads having a bolting face, an aperture extending therethrough for reception of a threaded shank of a bolt, and a recess in said bolting face for reception of a head of the bolt in a manner which permits pivotal movement of the bolt about a pivotal axis;
   b) a member slidable longitudinally of said shank and an adjacent bolting pad and having a first surface portion engageable with a correspondingly configured surface portion of said adjacent bolting paid, and an opposite substantially planar face in a manner to interconnect said bolting pads;
   c) a nut threaded onto said threaded shank and having an operative face for operative surface of engagement with said substantially planar face of said slidable member; and
   d) at least one structural abutment associated with at least one said bolting pad which prevents rotation of the bolt relative to said paid when positioned in said aperture, said at least one abutment preventing movement of said shank of said bolt laterally within said aperture.

9. A segmented pipe coupling, which comprises:
   a) at least two coupling segments having a bolting pad at each end for bolting interconnection with an adjacent coupling segment, said bolting pads each having a bolting face, an aperture extending therethrough for reception of a shank of a bolt having a generally longitudinal axis, and a recess in at least one of said bolting faces of at least one of said bolting pads for reception of a head of the bolt in a manner which permits pivotal movement of the bolt about a pivotal axis generally transverse to the longitudinal axis of the bolt;
   b) a saddle slidable longitudinally of the shank of the bolt, said saddle having a planer face for engagement by a nut on one side, and an opposite face defined by a surface of revolution on the other side, said adjacent bolting face of said adjacent bolting pad of said adjacent coupling segment having a recess defined by a surface of revolution corresponding with said surface of revolution of said saddle and structured and configured to maintain a predetermined radial position of the bolt with respect to said aperture; and
   c) at least one structural abutment associated with said at least one bolting pad which prevents rotation of the bolt about the generally longitudinal axis thereof relative to said pad when positioned in said aperture.

10. A segmented pipe coupling including at least two arcuately shaped coupling segments adapted to be assembled in end-to-end relationship and encircling the juxtaposed ends of pipes to be coupled, which comprises:
   a) a bolting pad at each end of said coupling segments for bolting interconnection with an adjacent bolting pad of an adjacent coupling segment, at least one of said bolting pads having a bolting face, an aperture extending therethrough for reception of a shank of a bolt, and a recess in said bolting face for reception of a head of the bolt in a manner which permits pivotal movement of the bolt about a pivotal axis generally transverse to the axis of the shank of the bolt;
   b) a saddle slidable longitudinally of the shank of the bolt, said saddle having a face defined by a surface of revolution and positionable in contacting relation with a corresponding surface of revolution defined by a face of an adjacent bolting pad;
   c) at least one structural abutment associated with each said bolting pads which prevents rotation of at least one of said head of the bolt and said saddle, and maintains a predetermined radial location of the shank of the bolt with respect to said aperture in said adjacent bolting pad; and
   d) a fastener engageable with the shank of the bolt for interconnecting said bolting pads by tensioning the shank of the bolt whereby said fastener engages said saddle in a manner which permits pivoting of said saddle while maintaining continuous face engagement therebetween.

11. The segmented pipe coupling of claim 10, wherein said corresponding surface of revolution has a radius generally greater than the radius of said surface of revolution of said saddle.

12. The segmented pipe coupling of claim 11, wherein each said bolting pad has at least two structural abutments associated therewith to prevent rotation of at least one of the head of the bolt and said saddle.

13. The segmented pipe coupling of claim 10, wherein said corresponding surface of revolution has a radius substantially equal to the radius of said surface of revolution of said saddle.

14. A segmented pipe coupling, which comprises:
   a) at least two coupling segments having a bolting pad at each end for bolting interconnection with an adjacent bolting pad of an adjacent coupling segment, at least one of said bolting pads having a bolting face, an aperture extending therethrough for reception of a threaded shank of a bolt, and a recess in said bolting face for reception of a head of the bolt in a manner which permits pivotal movement of the bolt about a pivotal axis, the head having at least one end face;
   b) a member slidable longitudinally of said shank and an adjacent bolting pad and having a first surface portion engageable with a correspondingly configured surface portion of said adjacent bolting pad, and an opposite substantially planar face;
   c) a nut threaded onto said threaded shank and having an operative face for operative surface engagement with said substantially planar face of said slidable member in a manner to interconnect said bolting pads; and d) at least one structural abutment associated with at least one of said bolting pads which faces said at least one end face of the head of the bolt so as to interfere with the head of the bolt in a manner which prevents rotation of the bolt relative to said pad when positioned in said aperture.

15. A segmented pipe coupling, which comprises:

a) at least two coupling segments, each having a bolting pad at least at one end for bolting interconnection with an adjacent bolting pad of an adjacent coupling segment, at least one of said bolting pads having a bolting face, an aperture extending therethrough for reception of a shank of a bolt, and a recess in said bolting face for reception of a head of the bolt in a manner which permits pivotal movement of the bolt about a pivotal axis;

b) a member slidable longitudinally of said shank and an adjacent bolting pad and having a first surface portion engageable with a correspondingly configured surface portion of said adjacent bolting pad, and an opposite substantially planar face;

c) a nut threaded onto said threaded shank and having an operative face for operative surface engagement with said substantially planar face of said slidable member in a manner to interconnect said bolting pads; and d) at least one structural abutment associated with at least one of said bolting pads which prevents rotation of the bolt relative to said pad when positioned in said aperture.

16. A segmented pipe coupling for coupling pipe sections having a generally longitudinal axis, which comprises;

a) plural coupling segments having a generally longitudinal axis aligned with the axis of the pipe sections, and a bolting pad at each end of said coupling segments for bolting interconnection with an adjacent bolting pad of an adjacent coupling segment, said bolting pads each providing a bolting face;

b) at least one of said bolting pads including a first recess in said bolting face for the reception of a head of a T-bolt, said recess having two inclined faces intersecting along a line generally parallel to said longitudinal axis to define a pivotal axis;

c) an aperture in each said bolting pads for permitting insertion of a shank of a bolt therethrough;

d) a T-bolt associated with each pair of adjacent bolting pads and having a head and a shank, said shank being inserted into and extending through said bolting pads to interconnect said coupling segments, said head of said T-bolt being defined on one side by two inclined surfaces intersecting along a line defining a pivotal axis and receivable within said first recess in said at least one of said bolting faces, said head further including a member receivable within a second recess in said bolting pad for limiting transverse movement of said shank of said bolt with respect to said apertures in said bolting pads;

e) said shank of said bolt being threaded; and, f) a nut threaded onto said threaded shank and operative to interconnect said bolting pads.

17. The segmented pipe coupling of claim 16, in which said longitudinal axis of said head of said T-bolt extends perpendicular to a longitudinal axis of said shank of said T-bolt.

18. The segmented pipe coupling of claim 17, further including a saddle slidable longitudinally of said shank, and which is engaged by said nut, said saddle providing a planar face for engagement by said nut and an opposite face, said adjacent bolting face being provided with a recess for reception of said opposite face of said saddle.

19. The segmented pipe coupling of claim 18, in which said bolt head defines a knife edge defining the pivotal axis thereof.

20. The segmented pipe coupling of claim 19, in which said opposite face of said saddle defines a knife edge defining a pivotal axis.

21. A segmented pipe coupling, including;

plural coupling segments having a bolting pad at each end of said coupling segments for bolting interconnection with an adjacent bolting pad of an adjacent coupling segment;

said bolting pads each providing a bolting face;

at least one of said bolting pads including a recess in said bolting face for the reception of a head of a T-bolt, said recess having two end faces;

apertures in said bolting pads permitting the insertion of a shank of a bolt through said apertures;

a T-bolt associated with each pair of adjacent bolting pads and having a generally cylindrical head and a shank, a longitudinal axis of said head extending substantially perpendicular to a longitudinal axis of said shank, said shank being inserted into and extending through said adjacent bolting pads;

said head of said T-bolt being configured to engage said at least one of said bolting pads in a manner which prevents rotational movement of said head with respect to said at least one bolting pad to thereby facilitate seating of said head with respect to said at least one bolting pad and defining a pivotal axis and receivable within said recess in said associated bolting face, said recess defining a corresponding pivotal axis, said head having end faces positionable opposite said respective end faces of said recess;

said shank of said bolt being threaded;

a saddle member slidable longitudinally of said shank and an adjacent bolting pad and having a first surface portion being a surface of revolution which is engageable with a correspondingly configured recessed surface portion of said adjacent bolting face of said adjacent bolting pad, said saddle member having an opposite substantially planar face; and a nut threaded onto said threaded shank and having an operative face for operative surface engagement with said substantially planar face of said slidable saddle member in a manner to interconnect said bolting pads;

so that said shank can move relative to said associated bolting pads into a position in which an operative surface portion of said head and an operative surface portion of said nut are in continuous face engagement with the respective associated adjacent operative surfaces to maintain said coupling segments in interconnected relation, and said end faces of said recess provide resistance to rotation of said end faces of said head.

22. The segmented pipe coupling of claim 21, in which said surface of revolution of said saddle member is a surface of a cylinder.

23. The segmented pipe coupling of claim 22, in which said surface of revolution of said saddle is a surface of a sphere.

24. The segmented pipe coupling of claim 23, in which said surface of revolution of said is a surface of a cylinder.

* * * * *